United States Patent
Tatebayashi et al.

[19]

[11] Patent Number: 6,049,611
[45] Date of Patent: Apr. 11, 2000

[54] ONE-WAY DATA CONVERSION APPARATUS AND DEVICE AUTHENTICATION SYSTEM

[75] Inventors: Makoto Tatebayashi, Takarazuka; Natsume Matsuzaki, Minou; Koichi Hirayama, Yokohama, all of Japan

[73] Assignees: Matsushita Electric Industrial Co., Ltd., Osaka; Kabushiki Kaisha Toshiba, Kanagawa-ken, Japan

[21] Appl. No.: 08/963,680

[22] Filed: Oct. 31, 1997

[30] Foreign Application Priority Data

Oct. 31, 1996 [JP] Japan .................................. 8-290375

[51] Int. Cl.$^7$ ...................................................... H04L 9/00
[52] U.S. Cl. ............................................. 380/44; 380/168
[58] Field of Search .............................. 380/1, 4, 9, 49, 380/2; 360/60; 375/348

[56] References Cited

U.S. PATENT DOCUMENTS

| | | | |
|---|---|---|---|
| 5,721,778 | 2/1998 | Kubota et al. ............................ | 380/10 |
| 5,754,649 | 5/1998 | Ryan et al. ................................ | 380/4 |
| 5,907,619 | 5/1999 | Davis ........................................ | 380/23 |
| 5,917,910 | 6/1999 | Ishiguro et al. ........................... | 380/4 |
| 5,960,086 | 9/1999 | Atalla ....................................... | 380/44 |

Primary Examiner—Tod R. Swann
Assistant Examiner—Todd Jack
Attorney, Agent, or Firm—Price, Gess & Ubell

[57] ABSTRACT

The verifier apparatus 50 includes a random number generation unit 51 that generates a 2n-bit random number, a separator unit 52 that separates the random number into two sets of n-bit data, a data conversion module 53 that converts one set of separated data using the other set of separated data as a key, and a comparator unit 54 that judges whether the converted result matches claimant data sent back from the claimant apparatus 60. The claimant apparatus 60 includes a separator unit 61 and a data conversion module 62 that have the same functions as the separator unit 52 and the data conversion module 53 in the verifier apparatus 50. The claimant apparatus 60 generates n-bit claimant data from the 2n-bit random number generated by the verifier apparatus 50, and sends the generated claimant data to the verifier apparatus 50.

25 Claims, 13 Drawing Sheets

3
ONE-WAY DATA CONVERSION APPARATUS AND DEVICE AUTHENTICATION SYSTEM

BACKGROUND OF THE INVENTION

1. Field of the Invention

The present invention relates to a one-way data conversion apparatus and a device authentication system in which it is used. In particular, the present invention relates to an authentication technique that uses a large amount of transfer data.

2. Description of the Prior Art

In systems that transfer data such as digitized text, audio, images, and programs via a network and systems that record such data for later retrieval, it is necessary to investigate whether a user is authorized before allowing the user to access the digital data. To do so, authentication procedures are performed to verify the validity of each access performed for a network or a recording medium.

The simplest authentication technique is a technique which receives a user ID and a password from a user who wishes to access the data. This method suffers from the drawback that easy for third parties to perform unauthorized access having obtained an ID and password, such as by intercepting their communication on a transfer path, so that this technique is not especially secure.

Two examples of highly secure conventional device authentication systems are a first prior art technique which uses a one-way function and a second prior art technique which uses an encryption module and a corresponding decryption module.

FIG. 1 is a block diagram showing the construction of a device authentication system that relates to the first prior art technique which uses a one-way function. This system is composed of a verifier apparatus 10 and a claimant apparatus 20 that are connected via transfer paths 24 and 25.

In this system, the verifier apparatus 10 which verifies the claimant apparatus 20 is composed of a random number generation unit 11, a transmission unit 14 for transmitting the generated random number to the claimant apparatus 20 as authentication data, a data conversion module 12 for converting the random number using a secret one-way function f( ), a reception unit 15 for receiving claimant data from the claimant apparatus 20, and a comparator unit 13 for judging whether the received claimant data matches the data generated by the data conversion module 12. It should be noted that the authentication data is challenge data that is transmitted to the verifier apparatus 10 to the claimant apparatus 20, and is data by which the verifier apparatus 10 gives the claimant apparatus 20 an opportunity to prove its validity.

On the other hand, the claimant apparatus 20 proves its validity to the verifier apparatus 10, and is composed of a reception unit 22 for receiving the authentication data sent from the verifier apparatus 10, a data conversion module 21 for converting the authentication data using a secret one-way function f( ), and a transmission unit 23 for transmitting the data generated by the data conversion module 21 to the verifier apparatus 10 as the claimant data. It should be noted here that the claimant data is response data sent by the claimant apparatus 20 to the verifier apparatus 10 to prove the validity of the claimant apparatus 20.

In the present figure, the data conversion module 12 provided in the verifier apparatus 10 and the data conversion module 21 provided in the claimant apparatus 20 are the same (which is to say, both data conversion modules perform conversion using the same function f( )), so that the same conversion of the random number generated by the random number generation unit 11 is performed by the verifier apparatus 10 and the claimant apparatus 20. This means that the comparison by the comparator unit 13 should result in a match. In such a case, the verifier apparatus 10 judges that the device currently in communication (the claimant apparatus 20) is equipped with a data conversion module that is the same as its own data conversion module 12, and accordingly authenticates the claimant apparatus 20.

On the other hand, when the comparator unit 13 finds that the comparison does not result in a match, the verifier apparatus 10 judges that the device currently in communication (the claimant apparatus 20) is not equipped a with a data conversion module that is the same as its own data conversion module 12, and so does not authenticate the claimant apparatus 20.

The reason a random number is generated for use as the authentication data every time authentication is to be performed by the system described above is as follows. If a third party who intercepts the communication on the transfer paths 24 and 25 obtains fixed authentication data that is used every time authentication is performed, the third party would thereafter be authenticated as a valid claimant apparatus.

FIG. 2 is a block diagram showing the construction of a device authentication system that relates to the second prior art technique which uses an encryption module and a corresponding decryption module.

While the verifier apparatus 10 and the claimant apparatus 20 in the first prior art technique are provided with the same data conversion module 12, 21, the apparatuses 30 and 40 in this second prior art technique are respectively equipped with an encryption module 32 for performing encryption according to a secret encryption algorithm E( ) and a decryption module 41 that performs decryption according to a secret decryption algorithm D( ) that is the inverse transformation of the encryption algorithm E( ). In the first prior art technique, the authentication data is a random number which is transmitted as it is, with the verifier apparatus 10 comparing the results of data conversion by the data conversion modules 12 and 21. In this second prior art technique, however, the authentication data is a cryptogram that has been produced by encrypting a random number, with the verifier apparatus 30 comparing the random number with the decrypted data sent from the claimant apparatus 40.

In this second prior art technique, when the comparator unit 33 finds that the random number and the decrypted data match, the verifier apparatus 30 judges that the device currently in communication (the claimant apparatus 40) is equipped with the decryption module 41 that corresponds to its own encryption module 32, and accordingly authenticates the claimant apparatus 40.

In these conventional device authentication systems, there needs to be a large number of combinations of authentication data and claimant data. This is to prevent an unauthorized third party intercepting the communication on the transfer paths 24, 25, 44, 45 and obtaining all possible pairs of authentication data and matching claimant data, a situation which is the equivalent of the third party having decoded the algorithms f( ), E( ), and D( ). It is also necessary to prevent an unauthorized device being used as the verifier apparatus to successively send every possible combination of authentication data to a valid claimant apparatus and, as a result, then obtain the correct claimant data for each possible authentication data.

For the prior art device authentication systems described above, it is necessary to have a number of combinations of authentication data and claimant data that is so large as to prevent the acquisition of all possible combinations of authentication data and claimant data given the effective limitations of processing performance and required time.

If the data length (bit length) of the authentication data in the above prior art device authentication systems is increased to increase the total number of combinations of authentication data and claimant data, there is the problem that the scale of the circuits used for the data conversion modules 12 and 21, the encryption module 32, and the decryption module 41 that receive an input of the authentication data will have to be greatly increased.

In the prior art device authentication system described above, the authentication data and claimant data are both 32 bits long, so that there are a total of $2^{32}$ combinations. Accordingly, $2^{32}$ combinations of authentication data and claimant data can appear on the transfer paths. If one combination appears on the transfer paths for a time period of 1 ms and is stolen by a third party, it would take the third party less than a week to obtain all of the possible combinations of authentication data and matching claimant data. Since a third party can obtain one hundredth of all of the possible combinations in little over an hour, there is a high possibility that an invalid device will soon be able to mimic a valid claimant apparatus. Accordingly, this number of combinations is not sufficient for the system to be secure.

In order to improve the security of the system, the number of combinations can be increased by increasing the bit length of the authentication data to 64 bits, although to do so, the scale of the circuits used for the data conversion modules 12 and 21, the encryption module 32, and the decryption module 41 needs to be at least doubled. The actual installation of such circuits, however, is extemely difficult due to tight restrictions regarding the scale of circuits in compact or portable electronic devices and due to the need for communication devices to perform authentication processes at high speed. As a result, such increases cannot realistically be made.

SUMMARY OF THE INVENTION

In view of the stated problems, it is a first object of the present invention to provide a device authentication system, and a one-way data conversion apparatus used by the device authentication system, that performs authentication with high security using authentication data with double the length of conventional authentication data, despite being achieved by a circuit whose scale differs little from that used by conventional techniques.

In order to achieve the stated first object, the one-way data conversion apparatus and encryption/decryption apparatuses used by a verifier apparatus and a claimant apparatus have input/output data whose data length is n bits, with both the verifier apparatus and the claimant apparatus being provided with an n-bit secret key, and the present invention making use of characteristic described below.

The present invention is a one-way data conversion apparatus that converts 2n-bit input data into meaningless n-bit output data. This one-way data conversion apparatus includes a separating unit for separating the 2n-bit input data into two n-bit sets of separated data each composed of n different bit positions of the input data to produce a first n-bit set of separated data and a second n-bit set of separated data, and a data conversion unit for generating output data by converting the first set of separated data according to a conversion algorithm with the second set of separated data as a conversion key.

This one-way data conversion apparatus is achieved by merely adding a simple wiring layout (separating unit) for performing bit separation to a unit (data conversion unit) that converts n-bit input data into n-bit output data. Accordingly, by installing such a one-way data conversion apparatus in both a verifier apparatus and a claimant apparatus, a device authentication system that performs authentication with high security using authentication data with double the length of conventional authentication data, can be realized despite having a circuit scale that differs little from that under conventional techniques.

Putting this into other words, by adding a minor amount of hardware to a conventional device authentication system that performs authentication using authentication data and claimant data that are n bits long, a device authentication system that performs authentication using authentication data that is 2n-bits long and claimant data that is n bits long can be achieved. Accordingly, the number of possible combinations of authentication data and claimant data are increased from $2^n$ to $2^{2n}$ (which is $2^n$ greater), meaning that a highly secure device authentication system is achieved.

One example of a device authentication system that uses this kind of one-way data conversion apparatus is described below. The verifier apparatus includes a random number generating unit that generates a 2n-bit random number, a separating unit that separates the random number into an n-bit first set of separated data and an n-bit second set of separated data, a data conversion unit that converts the first set of separated data using the second set of separated data as a key, and a comparison unit that judges whether the n-bit data converted by the data conversion unit matches the n-bit claimant data sent back by the claimant apparatus. The claimant apparatus includes a separating unit and a data conversion unit that have the same functions as the separating unit and the data conversion unit in the verifier apparatus, generates n-bit claimant data from the 2n-bit random number generated by the verifier apparatus, and transmits the claimant data to the verifier apparatus.

In the above system, the data conversion unit may perform a conversion which is a one-way function. Also, instead of directly inputting the second set of separated data into the data conversion unit, a secret key that is stored beforehand may be changed using the second set of separated data and inputted into the data conversion unit for use as the key.

With the stated construction, it becomes very difficult to decode the data conversion unit and the algorithm performed by the one-way data conversion apparatus becomes more complex, thereby increasing the security of the system.

Another example of a device authentication system that uses this kind of one-way data conversion apparatus is described below. The verifier apparatus includes a random number generating unit that generates a 2n-bit random number, a separating unit that separates the random number into an n-bit first set of separated data and an n-bit second set of separated data which are composed of different bit positions of the random number, a data conversion unit that encrypts the first set of separated data using the second set of separated data as an encryption key to produce a cryptogram, a combining unit that combines the cryptogram and the second set of separated data and mixes their bit positions to generate 2n-bit output data, and a comparison unit that judges whether the first set of separated data matches the claimant data sent back by the claimant apparatus. The claimant apparatus includes a separating unit that produces an n-bit third set of separated data that is the same as the cryptogram and an n-bit fourth set of separated data that is the same as the second set of separated data by separating two n-bit sets of data from different bit positions of the authentication data sent from the verifier apparatus, and a decryption unit that generates n-bit claimant data to be sent back to the verifier apparatus by decrypting the third set of separated data using the fourth set of separated data as the decryption key.

Here, instead of directly inputting the second (fourth) set of separated data into the encryption (decryption) unit, a secret key that is stored beforehand may be changed using the second (fourth) set of separated data and inputted into the encryption (decryption) unit for use as the encryption (decryption) key.

By doing so, a device authentication system that performs authentication with high security using 2n-bit authentication data and n-bit claimant data can be realized despite having a circuit scale that differs little from that under conventional techniques where the components are only designed to handle n-bit data, which is to say, despite using an encryption unit in the verifier apparatus and a decryption unit in the claimant apparatus that only handle n-bit data.

With the present invention described above, the one-way data conversion apparatus and encryption/decryption units used for authentication are only slightly larger than those used conventionally, but are able to handle $2^n$ as many combinations of authentication data and claimant data, so that illegal acquisition by a third party of all of the combinations of the authentication data and claimant data that appear on the transfer path one at a time when authentication is performed becomes incredibly difficult, thereby preventing unauthorized third parties from being authenticated.

As described above, the present invention achieves an authentication system which is highly secure against attack by third parties despite using only a small increase in hardware over conventional systems, so that the practical effect of present invention is considerable.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

The following is a detailed description of the device authentication systems to which the present invention relates, with reference to the drawings.

First Embodiment

Figure 3:
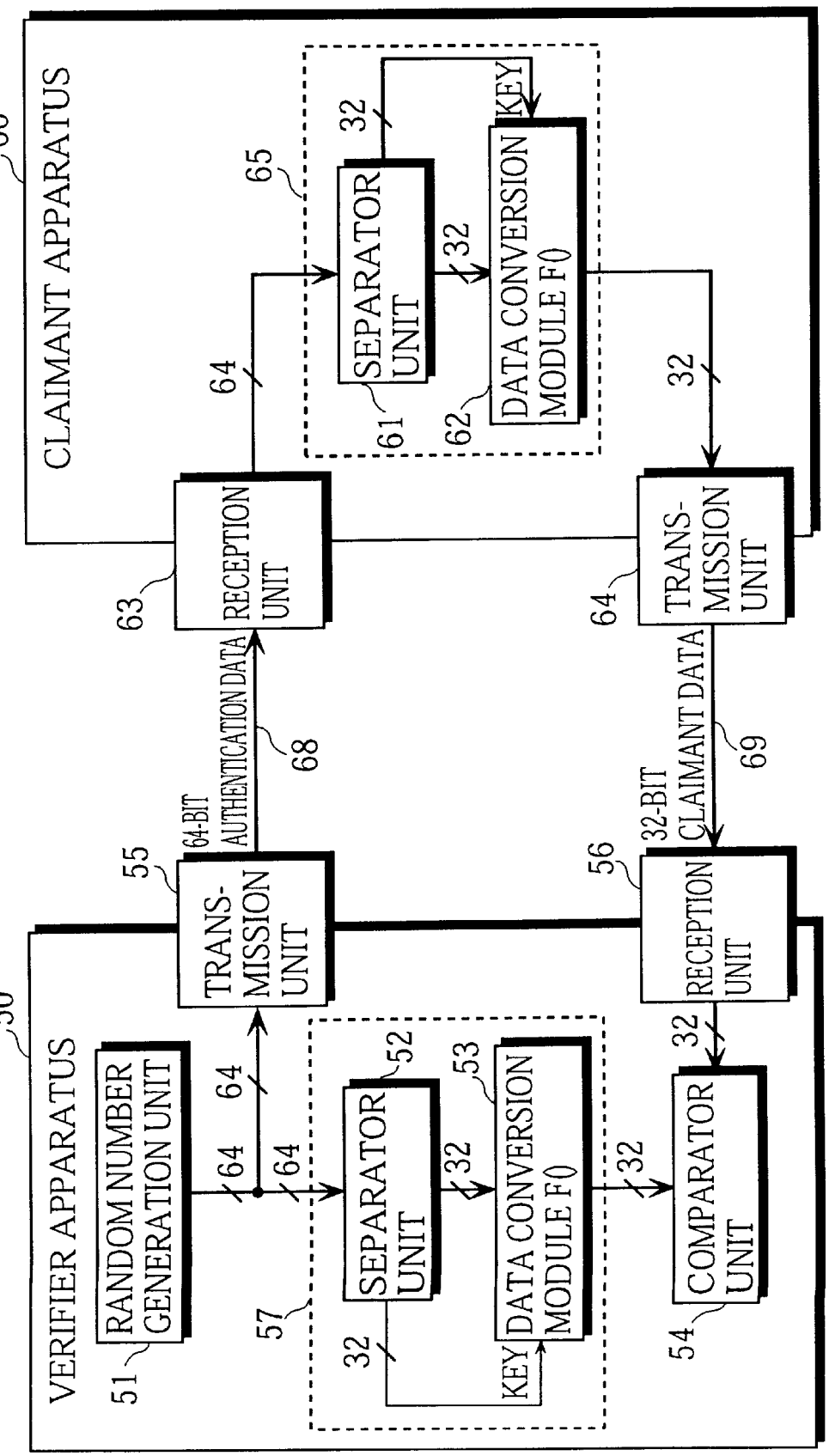
FIG. 3 is a block diagram showing the construction of the device authentication system of the first embodiment of the present invention.

FIG. 3 is a block diagram showing the construction of the device authentication system of the first embodiment of the present invention. This system is a device authentication system that uses a one-way data conversion apparatus and is composed of a verifier apparatus 50 and a claimant apparatus 60 that are connected by transfer paths 68 and 69.

The verifier apparatus 50 is an apparatus that authenticates the claimant apparatus 60, and comprises a random number generation unit 51, a one-way data conversion apparatus 57 (composed of a separator unit 52 and a data conversion module 53), a comparator unit 54, a transmission unit 55, and a reception unit 56.

The random number generation unit 51 generates one parallel 64-bit random number each time authentication is performed.

The transmission unit 55 can be composed of a parallel-to-series convertor, and is used to convert the parallel 64-bit random number generated by the random number generation unit 51 into series, before transmitting the converted random number to the claimant apparatus 60 via the transfer path 68 as the authentication data.

The one-way data conversion apparatus 57 is a circuit which converts the 64-bit input data into 32-bit output data according to a secret conversion algorithm. To ensure security of this circuit, it is formed as an IC on one silicon substrate. As shown in FIG. 3, the one-way data conversion apparatus 57 is composed of a separator unit 52 and a data conversion module 53.

A one-way data conversion apparatus as defined here is a module that converts input data into a set of output data using a conversion whereby definite specification of the input data is not possible from the generated output data. As described above, the one-way data conversion apparatus 57 generates output data of a shorter bit length than the input data, and so can be said to perform a one-way function.

Figure 4:
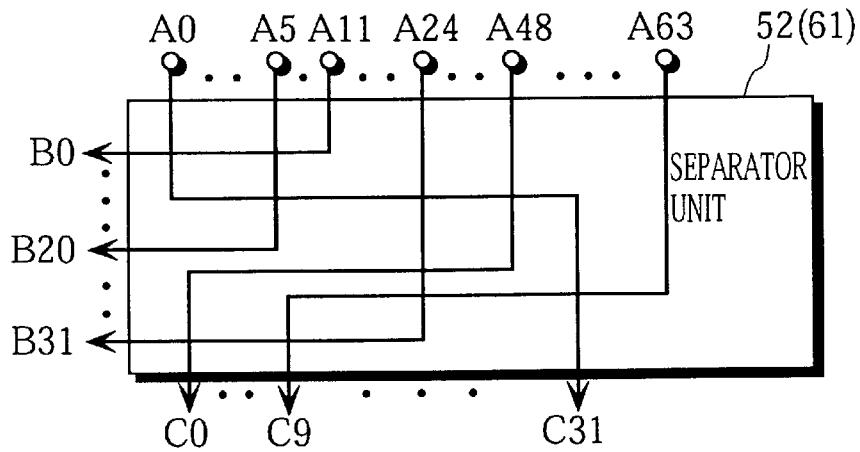
FIG. 4 shows the detailed construction of the separator unit 52 (61) in the present device authentication system.

The separator unit 52 has the fixed wiring layout shown in FIG. 4, and separates the 64-bit random number A0–A63 generated by the random number generation unit 51 into two 32-bit sets of separated data (B0–B31 and C0–C31) according to an irregular bit distribution. This is to say, the two sets of separated data are each made up of thirty-two digits taken from the 64-bit random number.

The data conversion module 53 is a logic circuit that sets one of the 32-bit sets of separated data (C0–C31) generated by the separator unit 52 as the subject of conversion and performs conversion according to a conversion function F( ) with the other set of separated data (B0–B31) as the key to produce a set of meaningless 32-bit data.

The reception unit 56 can be composed of a series-to-parallel convertor, and receives the series 32-bit claimant data sent from the claimant apparatus 60 in response to the authentication data sent by the transmission unit 55. The reception unit 56 converts the received data into parallel and outputs it to the comparator unit 54.

The comparator unit 54 can be composed of a latch circuit and a comparator circuit, and compares the 32-bit data generated by the data conversion module 53 with the 32-bit claimant data received from the reception unit 56 to see whether they match. When the sets of data match, the verifier apparatus 50 authorizes the claimant apparatus 60, while when the sets of data do not match, the verifier apparatus 50 does not authorize the claimant apparatus 60.

The claimant apparatus 60 is an apparatus which proves its validity to the verifier apparatus 50, and is composed of a one-way data conversion apparatus 65 (including a separator unit 61 and a data conversion module 62), a reception unit 63, and a transmission unit 64.

The reception unit 63 can be composed of a series-to-parallel convertor and receives the series 64-bit authentication data sent from the verifier apparatus 50, converts it into parallel data, and sends it to the separator unit 61.

The one-way data conversion apparatus 65 is the same as the one-way data conversion apparatus 57 provided in the verifier apparatus 50, and so is a circuit that converts the 64-bit input data into 32-bit output data according to a secret conversion algorithm. To ensure security of this circuit, it is formed as an IC on one silicon substrate. As shown in FIG. 3, the one-way data conversion apparatus 65 is composed of a separator unit 61 and a data conversion module 62.

The separator unit 61 is the same as the separator unit 52 provided in the verifier apparatus 50 and is used to separate the 64-bit authentication data A0–A63 sent from the reception unit 63 into two 32-bit sets of separated data (B0–B31 and C0–C31).

The data conversion module 62 is the same as the data conversion module 53 provided in the verifier apparatus 50 and so is a logic circuit that sets one of the 32-bit sets of separated data (C0–C31) generated by the separator unit 61 as the subject of conversion and performs conversion according to a conversion function F( ) with the other set of separated data (B0–B31) as the key to produce a set of meaningless 32-bit data.

The transmission unit 64 can be composed of a parallel-to-series convertor and converts the 32-bit parallel data generated by the data conversion module 62 into series data that it transmits to the verifier apparatus 50 via the transfer path 69 as the claimant data.

Figure 5:
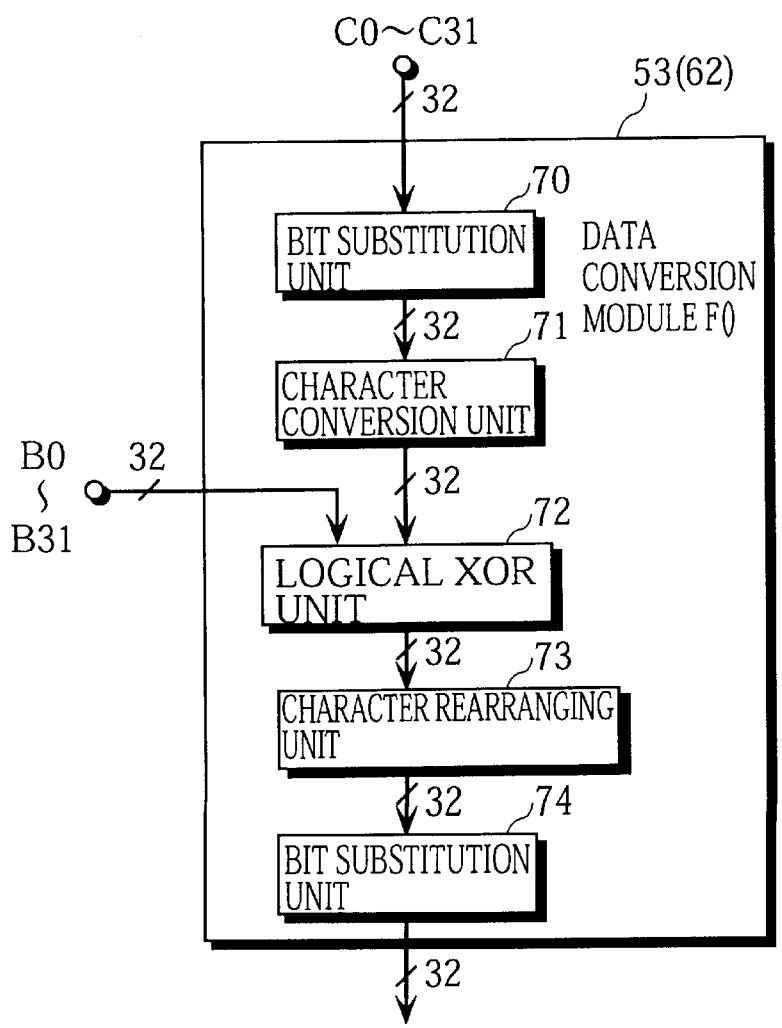
FIG. 5 is a block diagram showing the detailed construction of the data conversion module 53 (62) in the present device authentication system.

FIG. 5 is a block diagram showing the detail construction of the data conversion module 53 (and the data conversion module 62). As shown in FIG. 5, the data conversion module 53 (data conversion module 62) is composed of a bit substitution unit 70, a character conversion unit 71, a logical XOR unit 72, a character rearranging unit 73, and a bit substitution unit 74.

The bit substitution unit 70 can be composed of a latch circuit and an appropriate wiring layout, and irregularly interchanges the bit positions of the inputted 32-bit data C0–C31.

The character conversion unit 71 can be composed of a ROM that stores a character conversion table, and converts a character string for the 32-bit data outputted by the bit substitution unit 70 composed of four characters (achieved by setting each set of eight consecutive bits as a character) into a character string composed of four new characters.

Figure 6:
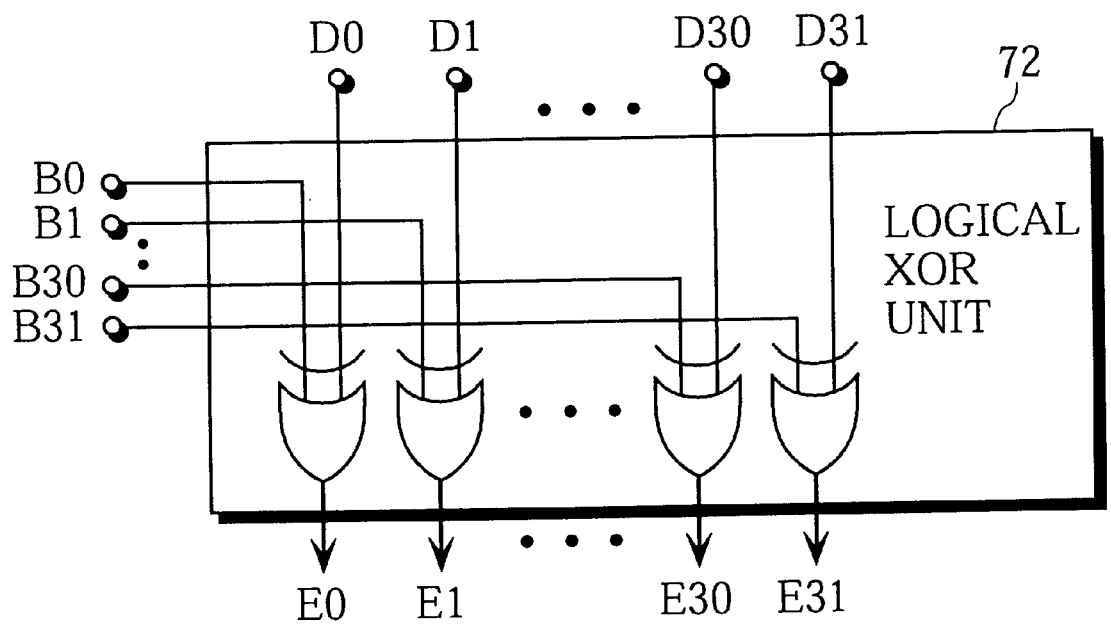
FIG. 6 shows the detailed construction of the logical XOR unit 72 of the data conversion module 53 (62)

The logical XOR unit 72 is composed of 32 XOR gates arranged as shown in FIG. 6. This logical XOR unit 72 takes a logical XOR for each bit of the 32-bit data D0–D31 outputted by the character conversion unit 71 with the separated data B0–B31 generated by the separator unit 52 (separator unit 61).

The character rearranging unit 73 can be composed of a latch circuit and an appropriate wiring layout, and sets the 32-bit data E0–E31 outputted by the logical XOR unit 72 as four characters each represented by eight-bits, before rearranging the order of the characters.

The bit substitution unit 74 can be composed of a latch circuit and an appropriate wiring layout, and irregularly interchanges the bit positions of the 32-bit data outputted by the character rearranging unit 73. This interchanging of bit positions differs from that performed by the bit substitution unit 70 and the character rearranging unit 73.

As described above, the data conversion module 53 (data conversion module 62) converts the input data C0–C31 into meaningless 32-bit output data, although the conversion algorithm used to do so is influenced by the separated data B0–B31 inputted into the logical XOR unit 72.

The following is a description of the operation of the present device authentication system whose construction has been explained above.

First, the random number generation unit 51 in the verifier apparatus 50 generates a 64-bit random number.

The transmission unit 55 transmits this 64-bit random number to the claimant apparatus 60 as the authentication data.

In the verifier apparatus 50, the separator unit 52 separates the 64-bit random number into two 32-bit sets of separated data, and the data conversion module 53 converts one set of separated data using the other set of separated data as the key.

Meanwhile, in claimant apparatus 60, the separator unit 61 separates the 64-bit authentication data received via the reception unit 63 into two 32-bit sets of separated data, and the data conversion module 62 converts one set of separated data using the other set of separated data as the key, before sending the converted result back to the verifier apparatus 50 via the transmission unit 64.

Finally, the comparator unit 54 of the verifier apparatus 50 compares the sets of 32-bit data outputted by the data conversion module 53 of the verifier apparatus 50 and the data conversion module 62 of the claimant apparatus 60. When the sets of data match, the verifier apparatus 50 authenticates the claimant apparatus 60 as a valid device.

Figure 1:
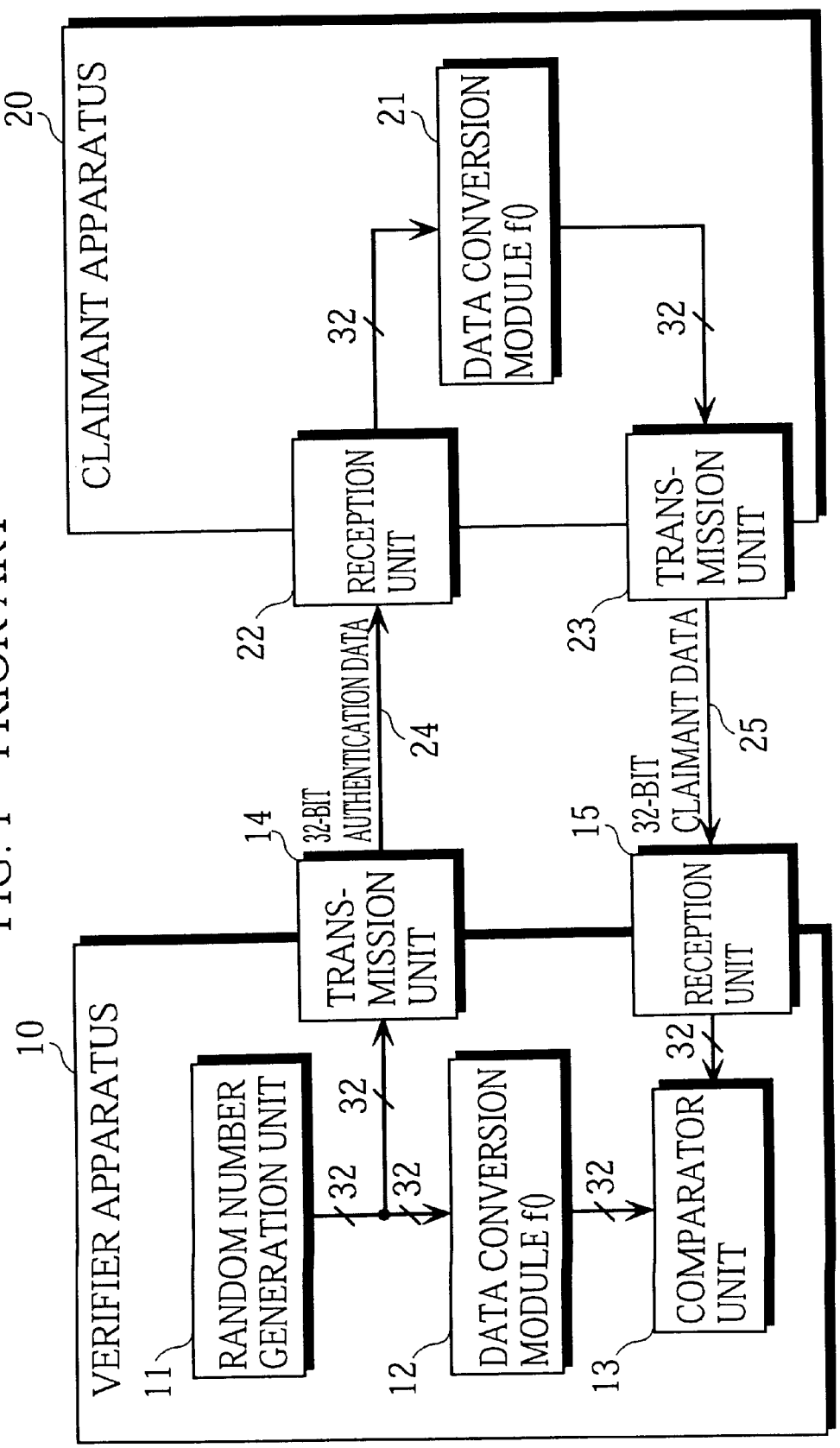
FIG. 1 is a block diagram showing the construction of a device authentication system that relates to the first prior art technique which uses a one-way function.

With the present device authentication apparatus described above, the authentication data transmitted to the claimant apparatus 60 from the verifier apparatus 50 has twice the length of the authentication data used in conventional systems such as that shown in FIG. 1, which is to say, the authentication data is 64 bits long. As a result, the total number of combinations of the authentication data and the claimant data is $2^{64}$. Putting this into other words, the total number of combinations of authentication data and the claimant data that may appear on the transfer paths of the present system is $2^{32}$ times greater than in conventional systems, making the present system far more secure from attack by third parties who intercept the communication on the transfer paths.

The hardware scale required by the present system, however, varies little from that described as the first prior art example. As can be seen by comparing FIG. 1 with FIG. 3, the main differences between the construction of the present device authentication system and the conventional system lie in (i) the addition of the separator unit 52 (separator unit 61), and (ii) the provision of the input port for a key on the data conversion module 53 (data conversion module 62). Of these, (i) the separator unit 52 (61) is simply achieved by a fixed wiring layout, while (ii) with the exception of the logical XOR unit 72, the components 70, 71, 73, and 74 of the data conversion module 53 (62) shown in FIG. 5 correspond to the components of the data conversion module 12 (21) of the conventional system in that they each convert 32-bit input data into output data.

As described above, the device authentication system of the present embodiment is able to perform authentication using authentication data that is twice as long as conventional systems despite using a circuit construction that differs little in scale.

Second Embodiment

Figure 7:
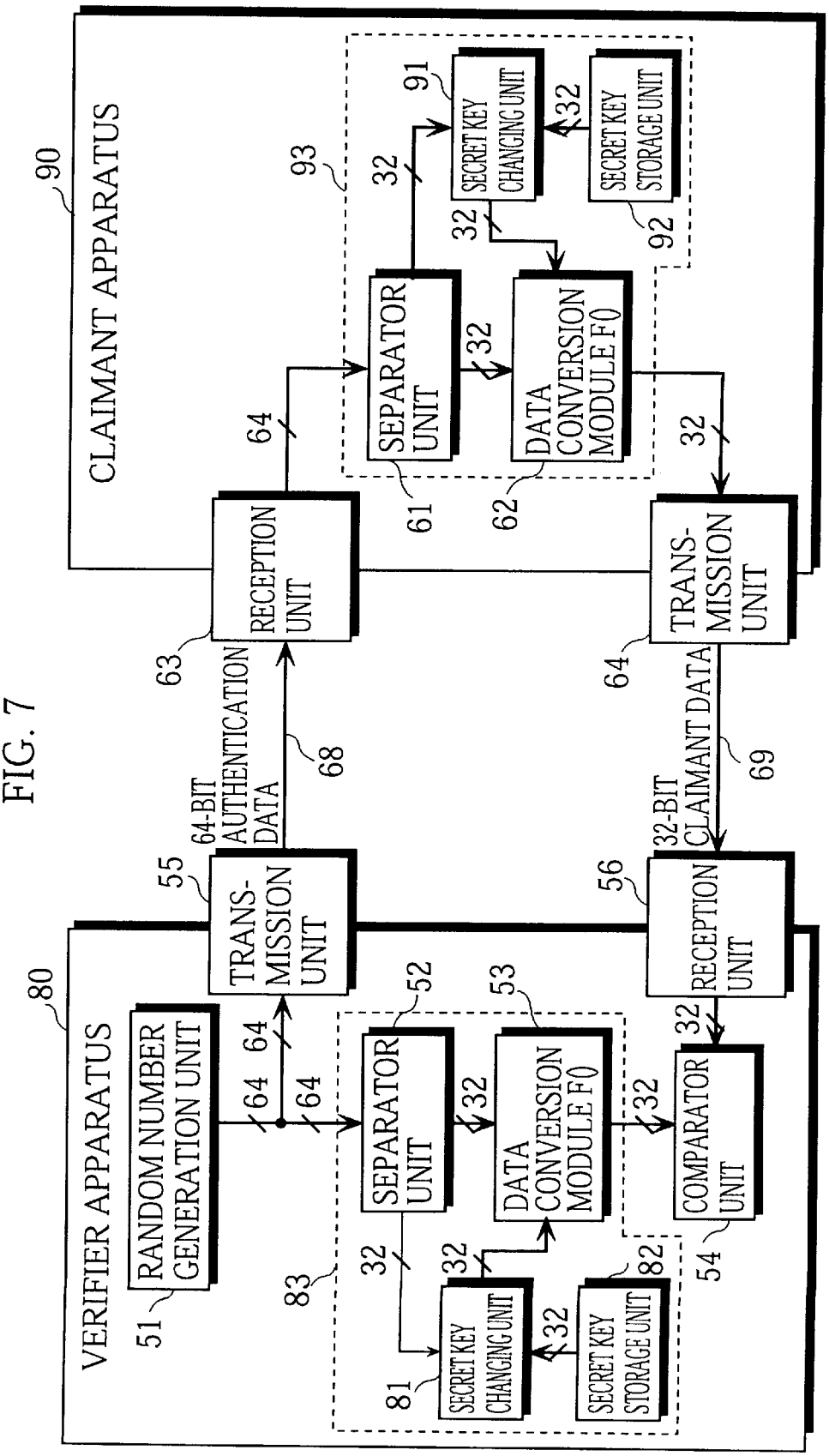
FIG. 7 is a block diagram showing the construction of the device authentication system of the second embodiment of the present invention.

FIG. 7 is a block diagram showing the construction of the device authentication system of the second embodiment of the present invention.

The present system, like that of the first embodiment, is composed of a verifier apparatus 80 and a claimant apparatus 90 that are connected by transfer paths 68 and 69. In the following explanation, components which are the same as in the first embodiment have been given the same reference numerals and their description has been omitted.

The one-way data conversion apparatus 83 provided in the verifier apparatus 80 is a circuit formed as an IC on one silicon substrate, in the same way as in the first embodiment. In addition tot he separator unit 52 and the data conversion module 53 of the first embodiment, this one-way data conversion apparatus 83 includes a secret key changing unit 81 and a secret key storage unit 82.

The secret key storage unit 82 can be composed of a ROM and stores one 32-bit secret key.

Figure 8:
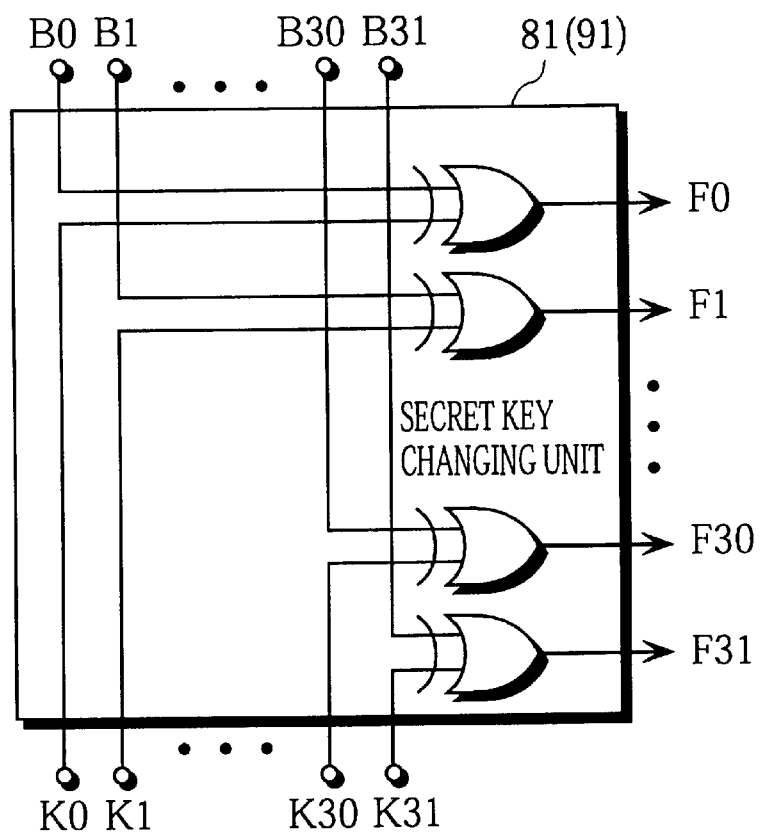
FIG. 8 shows the detailed construction of the secret key changing unit 81 (91) in the present device authentication system.

The secret key changing unit 81 is composed of 32 XOR gates which are arranged as shown in FIG. 8. This secret key changing unit 81 takes a logical XOR for each bit position of the 32-bit secret key read from the secret key storage unit 82 and th separated data B0–B31 generated by the separator unit 52, before outputting the result to the data conversion module 53.

In the first embodiment, the one-way data conversion apparatus 57 has the separated data B0–B31 generated by the separator unit 52 directly inputted into the data conversion module 53 as the key, while in the present embodiment, the separated data B0–B31 generated by the separator unit 52 is used to change the secret key stored in the secret key storage unit 82 (or is alternatively changed itself using the secret key stored in the secret key storage unit 82), with the changed secret key then being inputted into the data conversion, module 53 as the key.

In the claimant apparatus 90, meanwhile, the one-way data conversion apparatus 93 is a circuit formed as an IC on one silicon substrate, in the same way as the one-way data conversion apparatus 83 in the verifier apparatus 80. In addition to the separator unit 61 and the data conversion module 62 of the first embodiment, this one-way data conversion apparatus 93 includes a secret key changing unit 91 and a secret key storage unit 92.

The secret key storage unit 92 is the same as the secret key storage unit 82 of the verifier apparatus 80 and the secret key changing unit 91 is the same as the secret key changing unit 81 of the verifier apparatus 80.

With the present device authentication system constructed as described above, it is possible to perform device authentication using authentication data that is twice the size of the authentication data used in conventional systems despite using a circuit that differs little in scale from conventional systems.

The construction of the one-way data conversion apparatus 83 of the present embodiment equates to the addition of the separator unit 52 and the secret key changing unit 81 to the data conversion module 12 in the first prior art example. The circuit set composed of the data conversion module 53 and the secret key storage unit 82 of the present embodiment is a circuit set that converts 32-bit data using a fixed secret key, and can be said to correspond to the data conversion module 12 in the first prior art example that converts 32-bit data based on a fixed conversion algorithm without relying on a key received from outside.

Accordingly, the one-way data conversion apparatus 83 on the present embodiment is composed of the mere addition of a secret key changing unit 81 composed of 32 logical XOR gates and a separator unit 52 achieved by a fixed wiring layout to a conventional data conversion module 12, this representing a minor increase in circuitry. This is also true for the one-way data conversion apparatus one-way 93 provided in the claimant apparatus 90.

Compared with the first embodiment, the device authentication system of the present embodiment has the separated data generated by the separator unit 52 (61) changed before being inputted into the data conversion module 53 (62), with this change increasing the security of the system as a whole.

It should be noted that in the first and second embodiments, the one-way data conversion apparatuses 57, 65, 83, and 97 all receive 64-bit input data, perform separation, and generate 32-bit output data based on a conversion algorithm that uses bit substitution, although the present invention should not be construed as being limited to such bit numbers or such kind of conversion algorithm.

As one example, 120-bit input data may be separated into a 56-bit set of separated data and a 64-bit set of separated data, with the 64-bit set of separated data then being encrypted according to a data encryption standard (DES) using the 56-bit set of separated data as the encryption key.

In the first and second embodiments, the data conversion modules 53, 62 were described as reversible conversion modules (which is to say, conversion modules which perform a conversion where an inverse conversion that produces the original input data from the output data and the key is possible), although since the data conversion modules 53, 62 both perform conversion in the same direction (a conversion generating output data from the two sets of separated data), there is no need to use a conversion method which is reversible.

Third Embodiment

Figure 9:
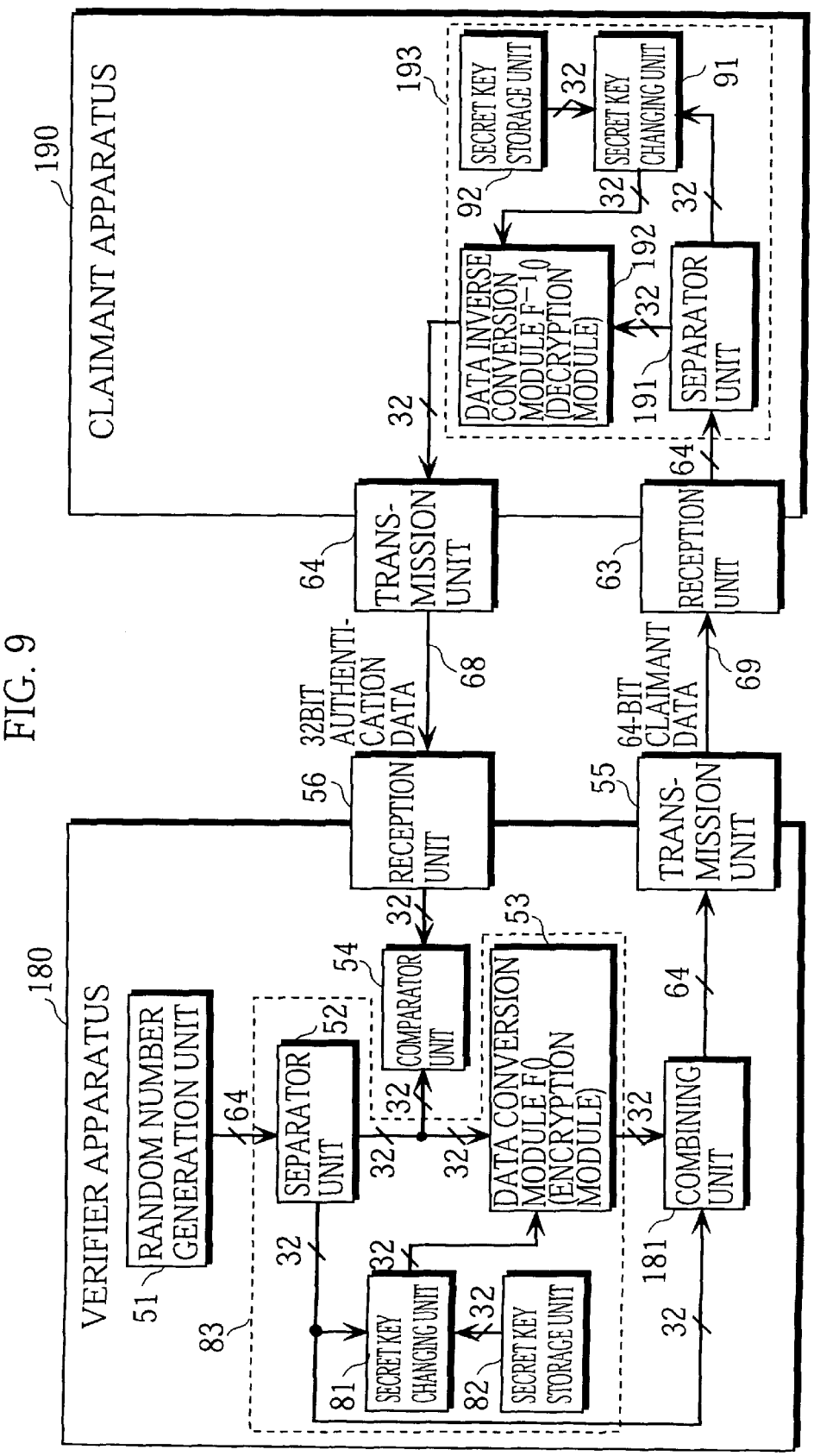
FIG. 9 is a block diagram showing the construction of the device authentication system of the third embodiment of the present invention.

FIG. 9 is a block diagram showing the construction of the device authentication system of the third embodiment of the present invention.

The present system, like the second prior art example, is a device authentication system that uses an encryption module and a corresponding decryption module and, as a modification of the second embodiment, is composed of a verifier apparatus 180 and a claimant apparatus 190 that are connected by transfer paths 68 and 69. In the following explanation, components which are the same as in the second embodiment have been given the same reference numerals and their description has been omitted.

The difference between the verifier apparatus 180 of the present embodiment and the verifier apparatus 80 of the second embodiment lies in the former being equipped a combining unit 181 in addition to the components 51, 83, and 54–56 of the verifier apparatus 80 of the second embodiment. It should be noted here that the data conversion module 53 is the same as that in the second embodiment, although it is used as an encryption module (with a decryption module for inverse transformation being possible and being provided in the present device authentication system (in the claimant apparatus 190)) in the present embodiment.

Figure 10:
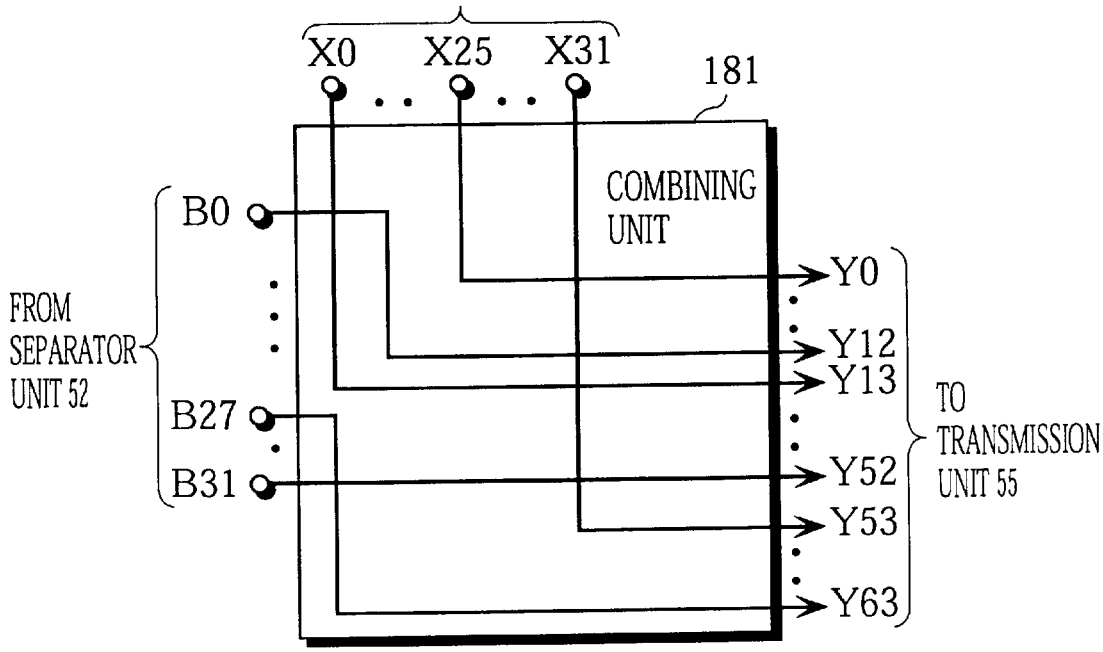
FIG. 10 shows the detailed construction of the combining unit 181 in the present device authentication system.

The combining unit 181 is composed of the fixed wiring layout shown in FIG. 10, and is used to compose one set of 64-bit data by combining the 32-bit set of separated data B0–B31 inputted into the secret key changing unit 81 from the separator unit 52 with the 32-bit data X0–X31 outputted by the data conversion module 53 while interchanging the bits of the sets of data in an irregular manner. The combining unit 181 sends the resulting combined data (Y0–Y63) to the transmission unit 55. In order to maintain security, the combining unit 181 is formed as an IC on one silicon substrate together with the other components 52, 53, 81, and 82 of the one-way data conversion apparatus 83.

The claimant apparatus 190 is the same as the second embodiment in that it includes a one-way data conversion apparatus 193, a reception unit 63, and a transmission unit 64, although there are differences in the construction of the one-way data conversion apparatus 193. In this third embodiment, the one-way data conversion apparatus 193 is composed of a secret key changing unit 91, a secret key storage unit 92, a separator unit 191, and a data inverse conversion module 192 which are formed as a single IC on a silicon substrate. Of these, the separator unit 191 and the data inverse conversion module 192 are unique to the present embodiment.

Figure 11:
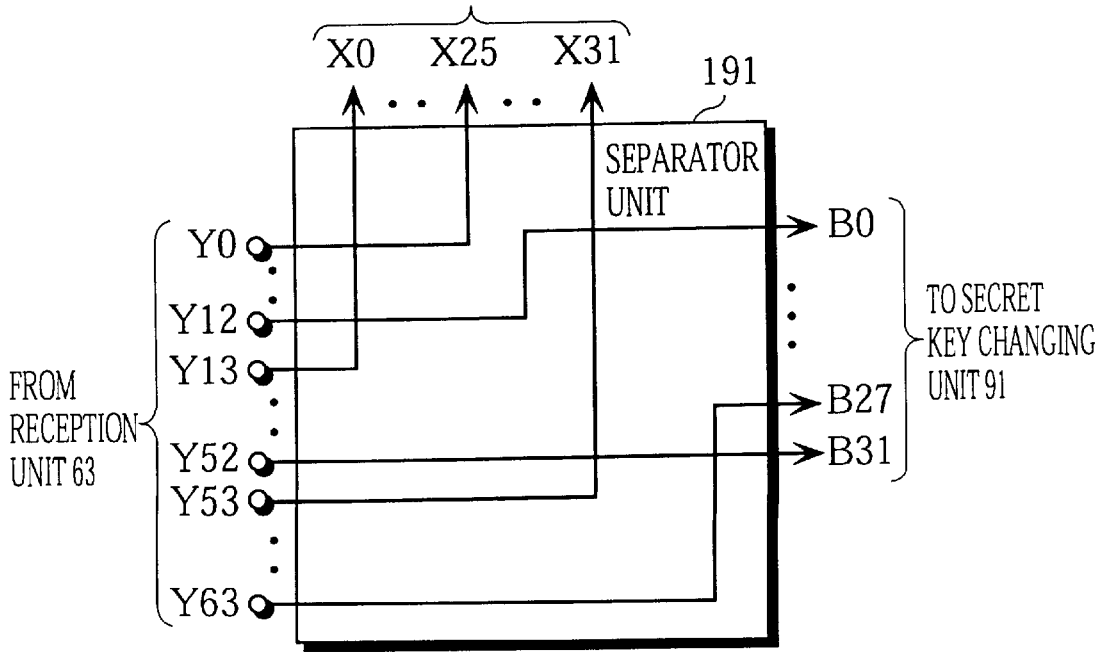
FIG. 11 shows the detailed construction of the separator unit 191 of the present device authentication system.

The separator unit 191 is composed of the fixed wiring layout shown in FIG. 11, and is used to separate the original 32-bit cryptogram X0–X31 and the 32-bit set of separated data B0–B31 from the 64-bit authentication data Y0–Y63 sent from the reception unit 63, in accordance with a bit assignment that equates to an inverse transformation of the bit combining performed by the combining unit 181.

The data inverse conversion module 192 is a decryption module that corresponds to the data conversion module (encryption module) 53 provided in the verifier apparatus 180. The data inverse conversion module 192 subjects the 32-bit cryptogram X0–X31 generated by the separator unit 191 to an inverse transformation according to the inverse transformation function $F^{-1}()$ using the other separated data B0–B31 as the key. By doing so, the data inverse conversion module 192 restores the original 32-bit separated data C0–C31.

Figure 12:
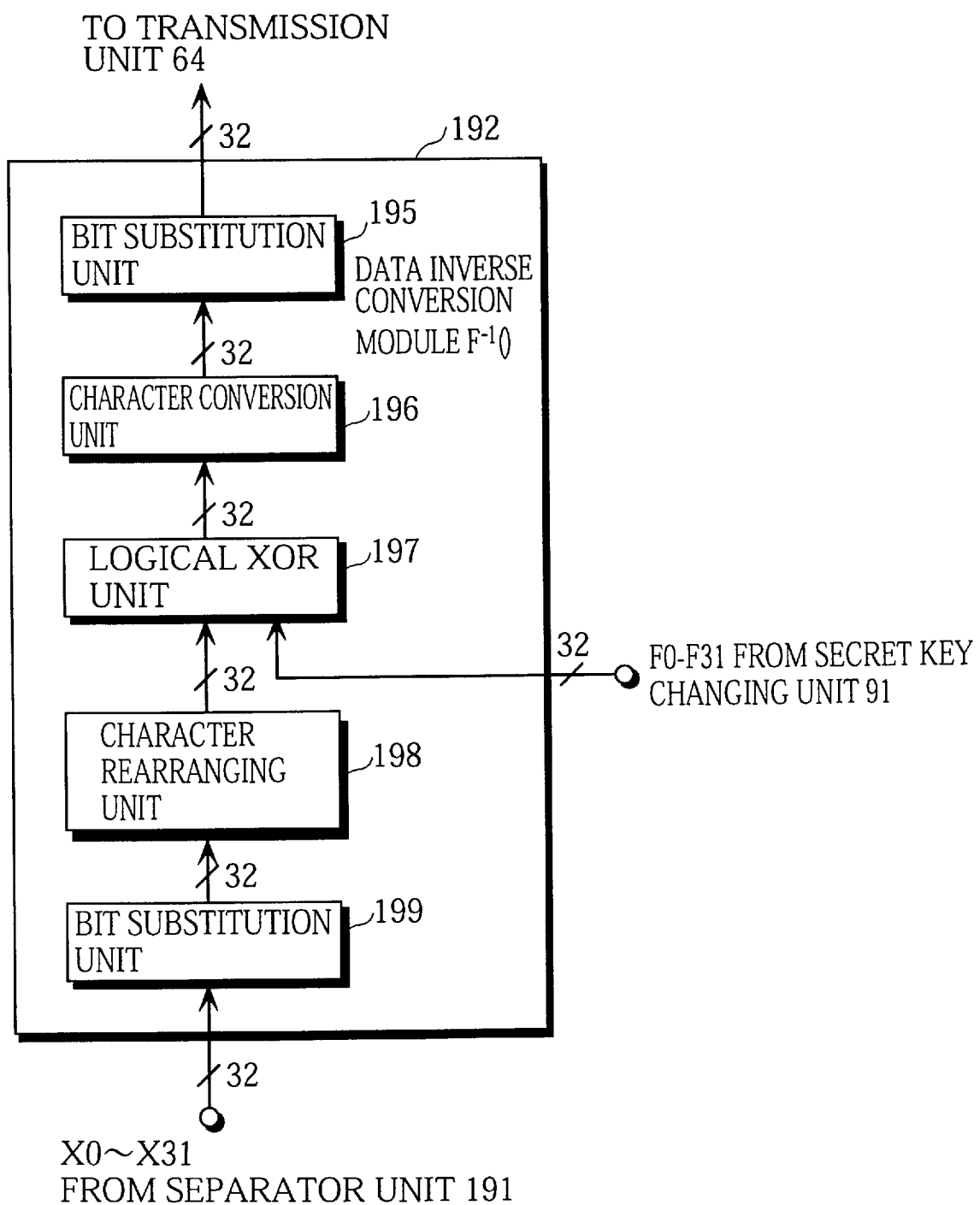
FIG. 12 is a block diagram showing the detailed construction of the data inverse conversion module 192 of the present device authentication system.

FIG. 12 is a block diagram showing the detailed construction of the data inverse conversion module 192.

The data inverse conversion module 192 is composed of a bit substitution unit 199, a character rearranging unit 198, a logical XOR unit 197, a character conversion unit 196, and a bit substitution unit 195, which each respectively correspond to components that perform the inverse operations of the bit substitution unit 74, the character rearranging unit 73, the logical XOR unit 72, the character conversion unit 71, and the bit substitution unit 70 of the data conversion module 53 shown in FIG. 5. It should be noted that the logical XOR unit 197 has the same construction as the logical XOR unit 72 (which is to say, 32 XOR gates) due to the nature of XOR conversions.

With the construction described above, an inverse relationship is established between the combining unit 181 and the separator unit 191, between the data conversion module 53 and the data inverse conversion module 192, and between the secret key storage unit 82 and the secret key storage unit 92, with the secret key changing unit 81 and the secret key storage unit 82 being identical to the secret key changing unit 91 and the secret key storage unit 92. As a result, the cryptogram inputted into the data inverse conversion module 192 is the same as the cryptogram outputted by the data conversion module 53, and the secret key inputted into the data inverse conversion module 192 is the same as the secret key inputted into the data conversion module 53, so that the decrypted data outputted by the data inverse conversion module 192 will be the same as the plaintext inputted into the data conversion module 53, which is to say, the same as the 32-bit separated data C0–C31 generated by the separator unit 52.

The comparator unit 54 in the verifier apparatus 180 therefore judges whether the separated data inputted from the separator unit 52 for the random number generated by the random number generation unit 51 matches the claimant data sent back from the claimant apparatus 190 in response to the authentication data generated from the same random number. When the data matches, the verifier apparatus 180 authenticates the claimant apparatus 190 as a valid device.

Figure 2:
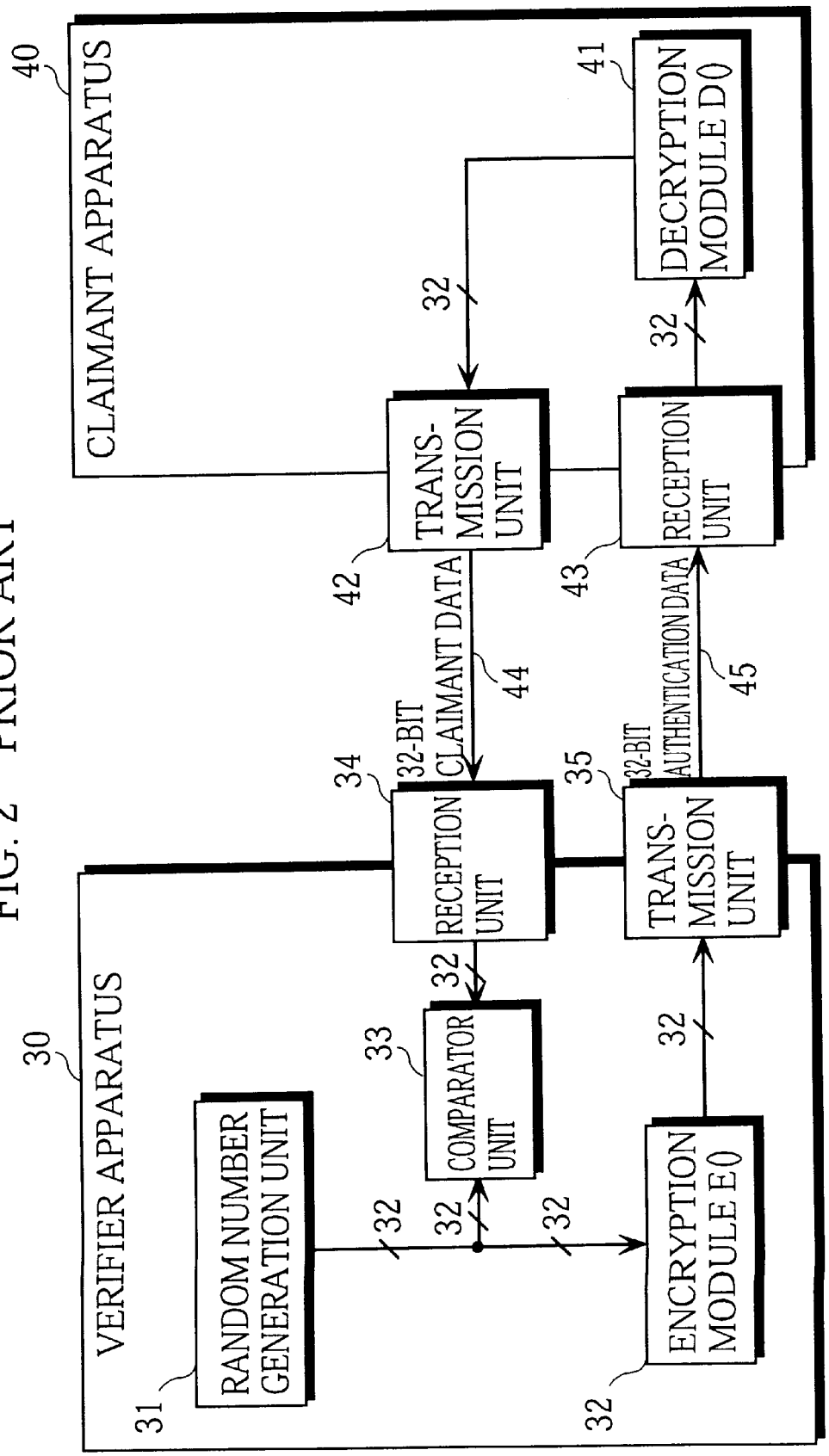
FIG. 2 is a block diagram showing the construction of a device authentication system that relates to the second prior art technique which uses an encryption module and a corresponding decryption module.

As can be seen by comparing the device authentication system described above with the second prior art example shown in FIG. 2, despite only adding a minimal amount of hardware (the separator units 52, 191, the secret key changing units 81, 91 and the combining unit 181), a total of $2^{64}$ combinations of authentication data and claimant data may appear on the transfer paths 68, 69 of the present system, a total which is $2^{32}$ times greater than the second prior art example. While mainly using the same 32-bit circuits as the second prior art example for the various circuits in the encryption and decryption modules, the present system is far more secure against attack by third parties who intercept the communication on the transfer paths.

It should be noted here that the data conversion module 53 was described as being the same as the data conversion module 53 of the second embodiment, although the present invention is not limited to such construction. Instead, it is also possible for an encryption module based on a DES standard to be used as the data conversion module 53, and for a corresponding decryption module to be used as the data inverse conversion module (decryption module) 192.

The present embodiment describes a modification of a system using the one-way data conversion apparatuses of the second embodiment to a system using an encryption module and a decryption module, although this modification may instead be made for a system using the one-way data conversion apparatuses of the first embodiment. This is to say, in the verifier apparatus 180 the separated data B0–B31 outputted by the separator unit 52 may be directly inputted into the encryption module 53 as the encryption key, while in the claimant apparatus 190, the separated data B0–B31 outputted by the separator unit 191 may be directly inputted in the decryption module 192 as the decryption key.

In the first to third embodiments, most of the construction elements are described as being achieved using logic circuits, although it is also possible for them to be achieved by software using a combination of a conventional microprocessor and a program. When doing so, the aspect of "circuit scale" refers to the code size of the software and the storage capacity of the PROM used to store the program.

Example Application in a Communication System

As described above, the device authentication system of the present invention can handle large-sized authentication data despite using only small-scale circuitry. Accordingly, the present device authentication system is ideal for use in communication systems where there is a demand for compactness and the ability to ensure that communication is only permitted between valid devices.

Figure 13:
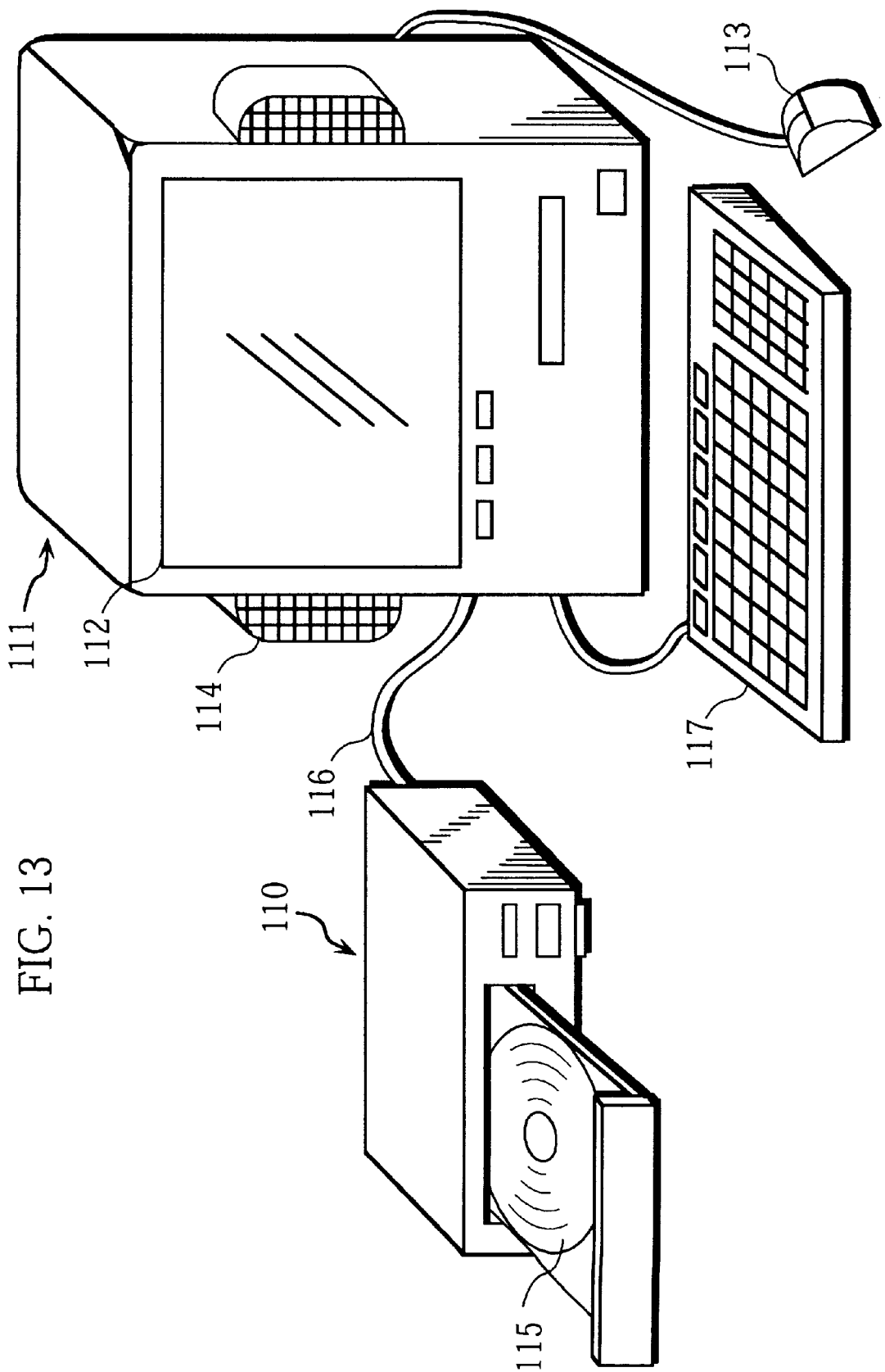
FIG. 13 shows a specific application of the device authentication system of the present invention in a communication system.

FIG. 13 shows the appearance of an application of the device authentication system of the present invention to a specific communication system, which is an image reproduction system for reproducing digital productions such as movies.

The system illustrated in FIG. 13 is composed of an optical disc drive apparatus 110 that is the verifier apparatus, an image reproduction apparatus 111 that is the claimant apparatus, and a SCSI cable 116, or the like, which connects the two. After authenticating the image reproduction apparatus 111, the optical disc drive apparatus 110 reads image data from the optical disc 115 and transmits the image data to the image reproduction apparatus 111 where the image data is reproduced.

Figure 14:
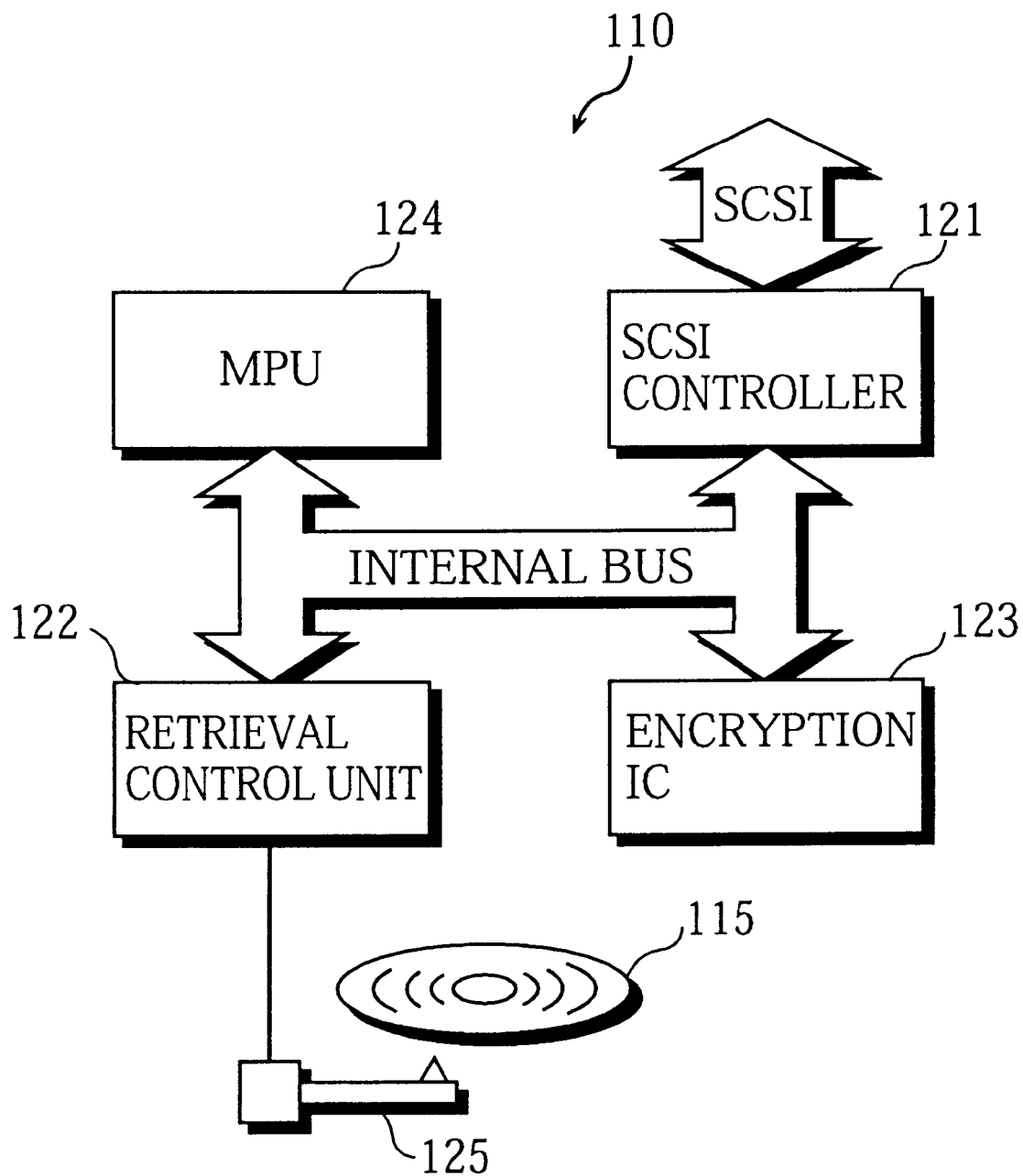
FIG. 14 is a block diagram showing the construction of the optical disc drive apparatus 110 (verifier apparatus) in the present communication system.

FIG. 14 is a block diagram showing the construction of the optical disc drive apparatus 110. As shown in FIG. 14, the optical disc drive apparatus 110 is composed of an MPU 124 for controlling the entire apparatus, a SCSI controller 121 which is a transmission interface for communication with the image reproduction apparatus 111, a retrieval control unit 122 for controlling the optical head 125 to control the retrieval of image data from the optical disc 115, and an encryption IC 123 that includes the one-way data conversion apparatus 57, 83, combining unit 181 and other components described in the preceding embodiments. When the image reproduction apparatus 111 has been authenticated as a valid device, the optical disc drive apparatus 110 reads the compressed image data recorded on the optical disc 115 and transfers the image data to the image reproduction apparatus 111 via the SCSI cable 116.

Figure 15:
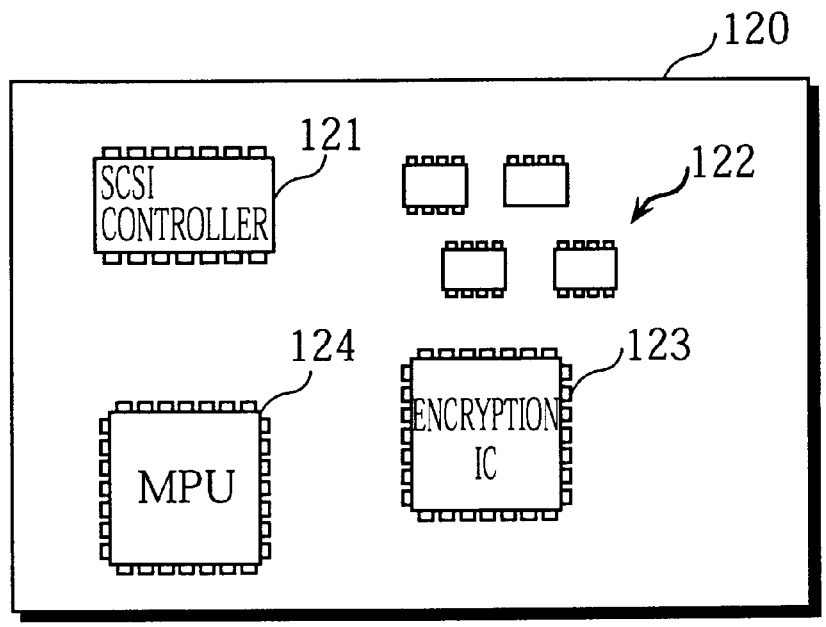
FIG. 15 is a representation of the circuit board installed in the optical disc drive apparatus 110.

FIG. 15 shows the appearance of the circuit board 120 installed inside the optical disc drive apparatus 110. As shown in FIG. 15, the encryption IC 123 is composed of an LSI formed on one silicon substrate and is formed as a flat package molded in plastic.

Figure 16:
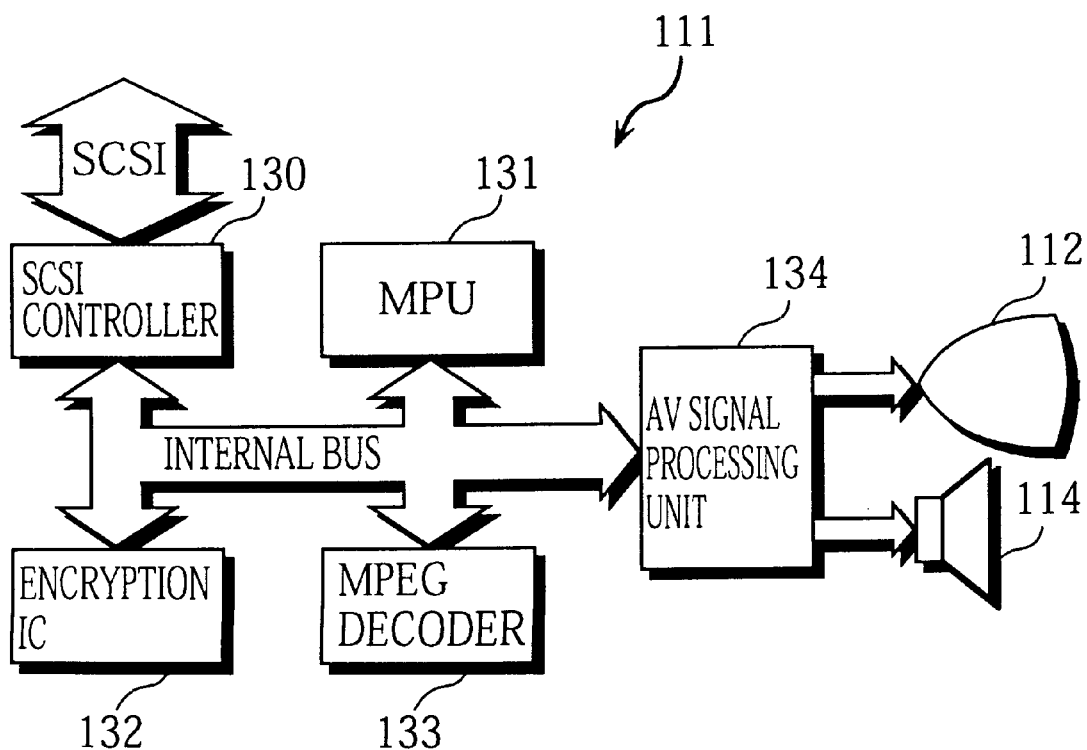
FIG. 16 is a block diagram showing the construction of the image reproduction apparatus 111 (claimant apparatus) in the present communication system.

FIG. 16 is a block diagram showing the construction of the image reproduction apparatus 111. As shown in FIG. 16, the image reproduction apparatus 111 is composed of an MPU 131 for controlling the entire apparatus, a SCSI controller 130 which is a communication interface for communicating with the optical disc drive apparatus 110, an encryption IC 132 that includes the one-way data conversion apparatus 65, 93, 193 described in the preceding embodiments, an MPEG decoder 133 for decompressing the received image data, and an AV signal processing unit 134 for converting the decompressed image data into an analog image signal and outputting images to the CRT 112 and audio to the speaker 114.

The circuit board installed inside the image reproduction apparatus 111 has almost the same appearance as that shown in FIG. 15.

By applying the device authentication system of the present invention to this kind of image reproduction system, the unauthorized copying of the digital production recorded on the optical disc 115 can be made far more difficult than under conventional techniques, despite using a circuit which is compact in size. As a result, the copyright of the digital production can be safely protected.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A one-way data conversion apparatus that converts 2n-bit input data into n-bit output data, comprising:

separating means for separating the 2n-bit input data into two n-bit sets of separated data each composed of n different bit positions of the input data, thereby producing a first n-bit set of separated data and a second n-bit set of separated data; and data conversion means for generating the output data by converting the first set of separated data according to a conversion algorithm with the second set of separated data as a conversion key, wherein the conversion algorithm is determined by the second set of separated data.

2. The one-way data conversion apparatus of claim 1, further comprising:

secret key storage means for storing an n-bit secret key; and secret key changing means for generating an n-bit changed key by changing the secret key using the second set of separated data generated by the separating means, wherein the data conversion means converts the first set of separated data according to the conversion algorithm using the changed key as the conversion key in place of the second set of separated data.

3. The one-way data conversion apparatus of claim 2, wherein a conversion performed by the data conversion means is a one-way conversion.

4. A device authentication system composed of a verifier apparatus and a claimant apparatus that are connected by a transfer path, the verifier apparatus comprising:

random number generating means for generating a 2n-bit random number;

first transmission means for transmitting the random number to the claimant apparatus as authentication data;

first one-way data conversion means for receiving the random number as input data and converting the input data into n-bit output data according to a secret algorithm;

first reception means for receiving n-bit claimant data sent back from the claimant apparatus in response to the authentication data; and comparison means for judging whether the output data of the first one-way data conversion means matches the claimant data, and the claimant apparatus comprising:

second reception means for receiving the authentication data sent from the verifier apparatus;

second one-way data conversion means for receiving the authentication data as input data and converting the input data into n-bit output data according to the same secret algorithm as in the verifier apparatus; and second transmission means for transmitting the output data of the second one-way data conversion means to the verifier apparatus as the claimant data in response to the authentication data.

5. The device authentication system of claim 4, wherein the first one-way data conversion means and the second one-way data conversion means each include:

separating means for separating the input data into two n-bit sets of separated data each composed of n different bit positions of the input data, thereby producing a first n-bit set of separated data and a second n-bit set of separated data; and data conversion means for generating the output data by converting the first set of separated data according to a conversion algorithm with the second set of separated data as a conversion key, wherein the conversion algorithm is determined by the second set of separated data.

6. The device authentication system of claim 5, wherein the first one-way data conversion means and the second one-way data conversion means each further include:

secret key storage means for storing an n-bit secret key; and secret key changing means for generating an n-bit changed key by changing the secret key using the second set of separated data generated by the separating means, wherein the data conversion means in the first one-way data conversion means and in the second one-way data conversion means each convert the first set of separated data according to the conversion algorithm using the changed key as the conversion key in place of the second set of separated data.

7. The device authentication system of claim 6, wherein a conversion performed by the data conversion means in each of the first one-way data conversion means and the second one-way data conversion means is a one-way conversion.

8. A verifier apparatus for use in a device authentication system composed of the verifier apparatus and a claimant apparatus that are connected by a transfer path, the verifier apparatus comprising:

random number generating means for generating a 2n-bit random number;

transmission means for transmitting the random number to the claimant apparatus as authentication data;

one-way data conversion means for receiving the random number as input data and converting the input data into n-bit output data according to a secret algorithm;

reception means for receiving n-bit claimant data sent back from the claimant apparatus in response to the authentication data; and comparison means for judging whether the output data of the one-way data conversion means matches the claimant data.

9. The verifier apparatus of claim 8, wherein the one-way data conversion means includes:

separating means for separating the input data into two n-bit sets of separated data each composed of n different bit positions of the input data, thereby producing a first n-bit set of separated data and a second n-bit set of separated data; and data conversion means for generating the output data by converting the first set of separated data according to a conversion algorithm with the second set of separated data as a conversion key, wherein the conversion algorithm is determined by the second set of separated data.

10. The verifier apparatus of claim 9, wherein the one-way data conversion means further includes:

secret key storage means for storing an n-bit secret key; and secret key changing means for generating an n-bit changed key by changing the secret key using the second set of separated data generated by the separating means, wherein the data conversion means converts the first set of separated data according to the conversion algorithm using the changed key as the conversion key in place of the second set of separated data.

11. The verifier apparatus of claim 10, wherein a conversion performed by the data conversion means is a one-way conversion.

12. The verifier apparatus of claim 11, further comprising:

optical disc reading means for reading a digital production from an optical disc; and data transfer means for transferring the digital production to the claimant apparatus when the comparison means has judged that the output data of the one-way data conversion means matches the claimant data.

13. A claimant apparatus for use in a device authentication system composed of a verifier apparatus and the claimant apparatus that are connected by a transfer path, the claimant apparatus comprising:

reception means for receiving 2n-bit authentication data sent from the verifier apparatus;

one-way data conversion means for receiving the authentication data as input data and converting the input data into n-bit output data according to a secret algorithm; and transmission means for transmitting the output data of the one-way data conversion means to the verifier apparatus as claimant data in response to the received authentication data.

14. The claimant apparatus of claim 13, wherein the one-way data conversion means includes:

separating means for separating the input data into two n-bit sets of separated data each composed of n different bit positions of the input data, thereby producing a first n-bit set of separated data and a second n-bit set of separated data; and data conversion means for generating the output data by converting the first set of separated data according to a conversion algorithm with the second set of separated data as a conversion key, wherein the conversion algorithm is determined by the second set of separated data.

15. The claimant apparatus of claim 14, wherein the one-way data conversion means further includes:

secret key storage means for storing an n-bit secret key; and secret key changing means for generating an n-bit changed key by changing the secret key using the second set of separated data generated by the separating means, wherein the data conversion means converts the first set of separated data according to the conversion algorithm using the changed key as the conversion key in place of the second set of separated data.

16. The claimant apparatus of claim 15, wherein a conversion performed by the data conversion means is a one-way conversion.

17. The claimant apparatus of claim 16, further comprising:

transfer data receiving means for receiving a digital production that is transferred from the verifier apparatus; and image reproduction means for performing image reproduction of the received digital production.

18. A device authentication system composed of a verifier apparatus and a claimant apparatus that are connected by a transfer path, the verifier apparatus comprising:
random number generating means for generating a 2n-bit random number;
first separating means for separating the random number into two n-bit sets of separated data each composed of n different bit positions of the random number, thereby producing a first n-bit set of separated data and a second n-bit set of separated data;
encryption means for generating an n-bit cryptogram by encrypting the first set of separated data according to a encryption algorithm with the second set of separated data as an encryption key;
combining means for combining the second set of separated data and the generated cryptogram by mixing bit positions of the second set of separated data and the generated cryptogram to generate 2n-bit output data;
first transmission means for transmitting the output data of the combining means to the claimant apparatus as authentication data;
first reception means for receiving n-bit claimant data sent back from the claimant apparatus in response to the authentication data; and
comparison means for judging whether the first set of separated data matches the claimant data, and the claimant apparatus comprising:
second reception means for receiving the authentication data sent from the verifier apparatus;
second separating means for separating the received authentication data into two n-bit sets of separated data each composed of n different bit positions of the authentication data, thereby producing a third n-bit set of separated data and a fourth n-bit set of separated data, wherein a separation performed by the second separating means is an inverse transformation of a combining performed by the combining means;
decryption means for decrypting the third set of separated data according to a decryption algorithm using the fourth set of separated data as a decryption key to produce n-bit decrypted data, wherein the decryption algorithm is an inverse transformation of the encryption algorithm; and
second transmission means for transmitting the decrypted data to the verifier apparatus as the claimant data in response to the authentication data.

19. The device authentication system of claim 18, wherein the verifier apparatus further comprises:
first secret key storage means for storing an n-bit secret key; and
first secret key changing means for generating an n-bit changed key by changing the secret key using the second set of separated data generated by the first separating means, wherein the encryption means encrypts the first set of separated data according to the encryption algorithm using the changed key as the encryption key in place of the second set of separated data, and wherein the claimant apparatus further comprises:
second secret key storage means for storing an n-bit secret key; and
second secret key changing means for generating an n-bit changed key by changing the secret key using the fourth set of separated data generated by the second separating means,
wherein the decryption means decrypts the third set of separated data according to the decryption algorithm using the changed key as the encryption key in place of the fourth set of separated data.

20. A verifier apparatus for use in a device authentication system composed of the verifier apparatus and a claimant apparatus that are connected by a transfer path, the verifier apparatus comprising:
random number generating means for generating a 2n-bit random number;
separating means for separating the random number into two n-bit sets of separated data each composed of n different bit positions of the random number, thereby producing a first n-bit set of separated data and a second n-bit set of separated data;
encryption means for generating an n-bit cryptogram by encrypting the first set of separated data according to a encryption algorithm with the second set of separated data as an encryption key;
combining means for combining the second set of separated data and the generated cryptogram by mixing bit positions of the second set of separated data and the generated cryptogram to generate 2n-bit output data;
transmission means for transmitting the output data of the combining means to the claimant apparatus as authentication data;
reception means for receiving n-bit claimant data sent back from the claimant apparatus in response to the authentication data; and
comparison means for judging whether the first set of separated data matches the claimant data.

21. The verifier apparatus of claim 20, further comprising:
secret key storage means for storing an n-bit secret key; and
secret key changing means for generating an n-bit changed key by changing the secret key using the second set of separated data generated by the separating means, wherein the encryption means encrypts the first set of separated data according to the encryption algorithm using the changed key as the encryption key in place of the second set of separated data.

22. The verifier apparatus of claim 21, further comprising:
optical disc reading means for reading a digital production from an optical disc; and
data transfer means for transferring the digital production to the claimant apparatus when the comparison means has judged that the first set of separated data matches the claimant data.

23. A claimant apparatus for use in a device authentication system composed of a verifier apparatus and the claimant apparatus that are connected by a transfer path, the claimant apparatus comprising:
reception means for receiving 2n-bit authentication data sent from the verifier apparatus;

separating means for separating the received authentication data into two n-bit sets of separated data each composed of n different bit positions of the authentication data, thereby producing a first n-bit set of separated data and a second n-bit set of separated data;

decryption means for decrypting the first set of separated data according to a decryption algorithm using the second set of separated data as a decryption key to produce n-bit decrypted data; and transmission means for transmitting the decrypted data to the verifier apparatus as claimant data in response to the authentication data.

24. The claimant apparatus of claim 23, further comprising:

secret key storage means for storing an n-bit secret key; and secret key changing means for generating an n-bit changed key by changing the secret key using the second set of separated data generated by the separating means, wherein the decryption means decrypts the first set of separated data according to the decryption algorithm using the changed key as the encryption key in place of the second set of separated data.

25. The claimant apparatus of claim 24, further comprising:

transfer data receiving means for receiving a digital production that is transferred from the verifier apparatus; and image reproduction means for performing image reproduction of the received digital production.

* * * * *